April 14, 1970 F. H. VIVIAN 3,506,230

TRAILER SUPPORT DEVICE WITH CAMMING MEANS

Filed Oct. 29, 1968 2 Sheets-Sheet 1

INVENTOR:
FRANK H. VIVIAN
BY Donald R. Johnson
ATTY.

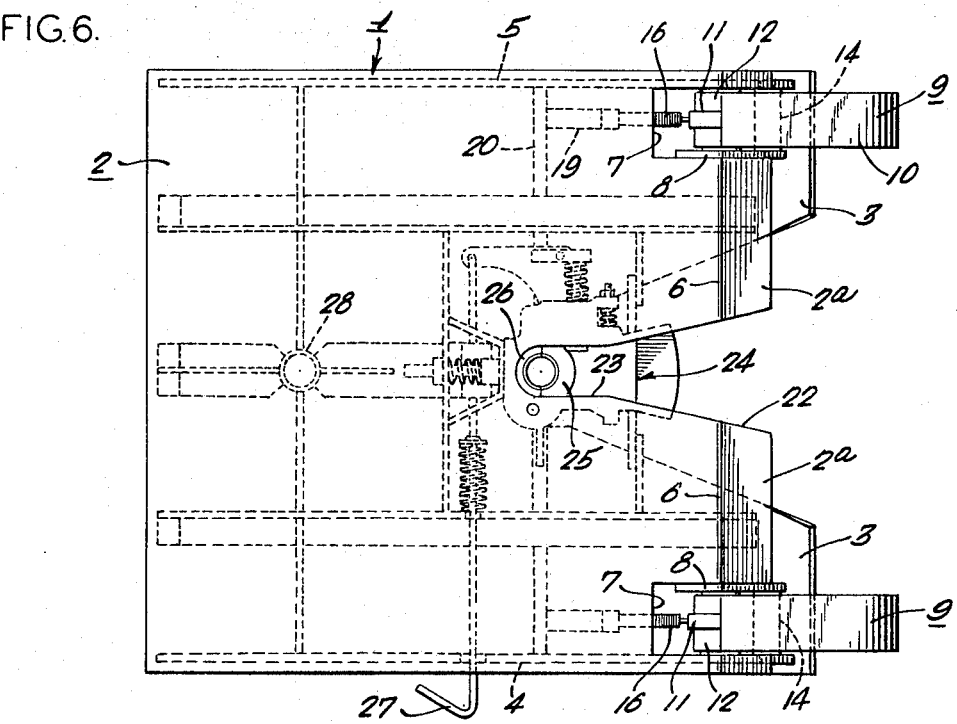
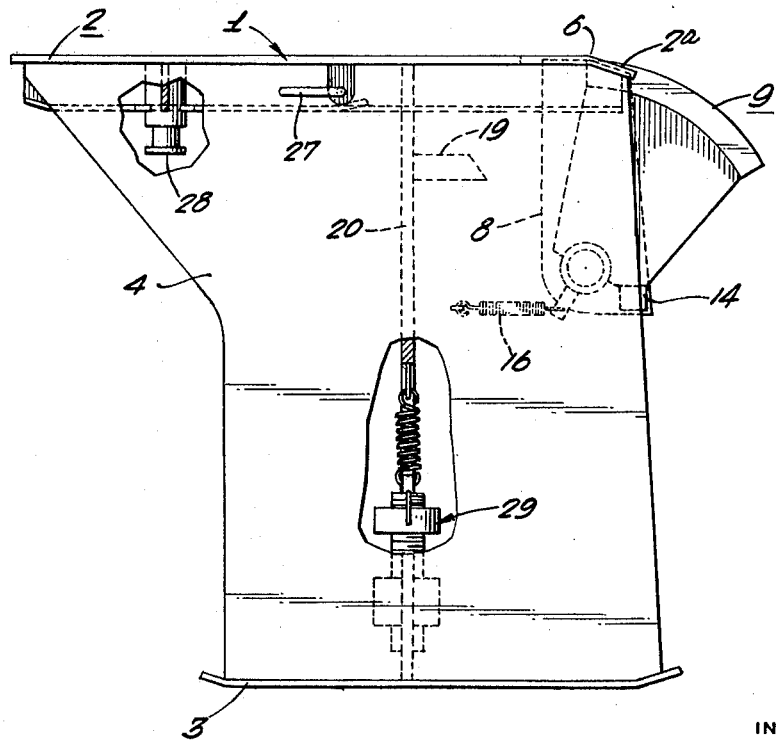

United States Patent Office 3,506,230
Patented Apr. 14, 1970

3,506,230
TRAILER SUPPORT DEVICE WITH CAMMING MEANS
Frank H. Vivian, Franklin, Kans., assignor, by mesne assignments, to Sun Shipbuilding and Dry Dock Company, Chester, Pa., a corporation of Pennsylvania
Filed Oct. 29, 1968, Ser. No. 771,459
Int. Cl. B60p 7/00
U.S. Cl. 248—119　　　　　　　　　　　6 Claims

ABSTRACT OF THE DISCLOSURE

In order to suitably support the forward end of a trailer on the deck of a ship while maintaining the trailer landing gear spaced above the deck, a rigid box-like structure is utilized, this structure being provided with a fixedly-mounted securing means for removably securing the trailer kingpin to the structure. In order to properly couple the support structure to a deposited trailer which is resting on its landing gear, the structure is provided with a camming means which raises the forward end of the trailer as the structure is moved rearwardly with respect thereto, thereby to bring the trailer kingpin into the proper position for cooperation with the kingpin securing means on the structure.

---

This invention constitutes an improvement on a trailer support device.

The prior art discloses a rigid support device or structure for supporting and securing the forward ends of truck trailers during transport thereof on auxiliary vehicles such as ships. It is important that the support device be of sufficient height to make certain that, when the trailer is positioned on the auxiliary vehicle, the landing gear of the trailer will be held above the deck or other supporting surface of such vehicle, both to prevent damage to the landing gear and also to make certain that the trailer is supported by the support device, rather than by the landing gear; the landing gear of a trailer cannot provide adequate support for the forward end of the trailer during transport of the same on auxiliary vehicles such as ships.

The trailer support device disclosed in the prior art includes, as a part thereof, a fixedly-mounted securing means for removably securing the kingpin of the trailer to the device. As a result of the requirement set forth in the preceding paragraph, the support device of the prior art is so designed as to require the grease plate of the trailer (which plate is located immediately adjacent to and above the kingpin, on the underside of the trailer body) to be at least 51 inches above ground level, to permit securing of the kingpin of the trailer to the support device. Since the average grease plate height of deposited highway trailers (i.e., trailers uncoupled from over-the-road tractors, and resting on their landing gear) is appreciably less than this minimum, it was necessary when using the device aforementioned to raise the forward end of the trailer until its grease plate height met the minimum height requirement; this was accomplished by raising the forward or front end of the trailer, and then placing blocks of the necessary thickness under the landing gear thereof.

An object of this invention is to provide a novel trailer support device.

Another object is to provide a trailer support device which is capable of use with deposited trailers of various grease plate heights, without the necessity of making any special height adjustments of the forward ends thereof.

A further object is to provide a trailer support device which eliminates the necessity of placing blocks under the landing gear of deposited trailers (in order to couple the trailer to the support device).

An additional object is to provide a trailer support device, of a height in excess of the height of the underside of a deposited highway trailer, which can be placed under the trailer without separately raising the forward end of the trailer, the raising being accomplished automatically by means provided on the support device.

The objects of this invention are accomplished, briefly, in the following manner: A rigid trailer support device intended to be coupled to the kingpin of a deposited trailer is provided with a camming member which is rotatably mounted in the device near the rear thereof and which provides a camming surface extending rearwardly of the device and downwardly from the top wall thereof. As the device is moved under a deposited trailer, the nose plate of the trailer contacts the camming surface and, as further rearward motion of the device takes place, rotation of the camming member raises the forward end of the trailer to bring it to the required height for coupling of the trailer kingpin to the support device.

A detailed description of the invention follows, taken in conjunction with the accompanying drawings, wherein:

FIG. 6 is a top or plan view similar to FIG. 3, but showing the entire support; and FIG. 7 is a side elevation of the support.

Figure 1:
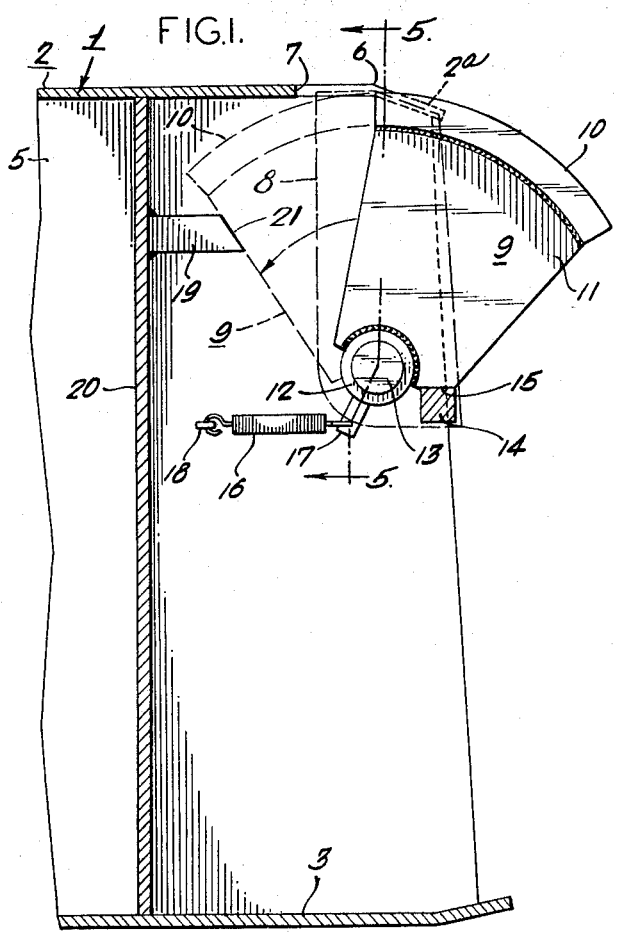
FIG. 1 is a fragmentary longitudinal sectional view, in the manner of an elevation, through a support according to the invention.
Figure 2:
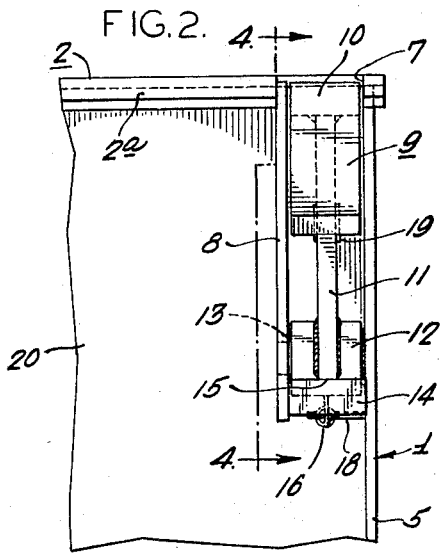
FIG. 2 is a rear elevation of one side of the support.
Figure 5:
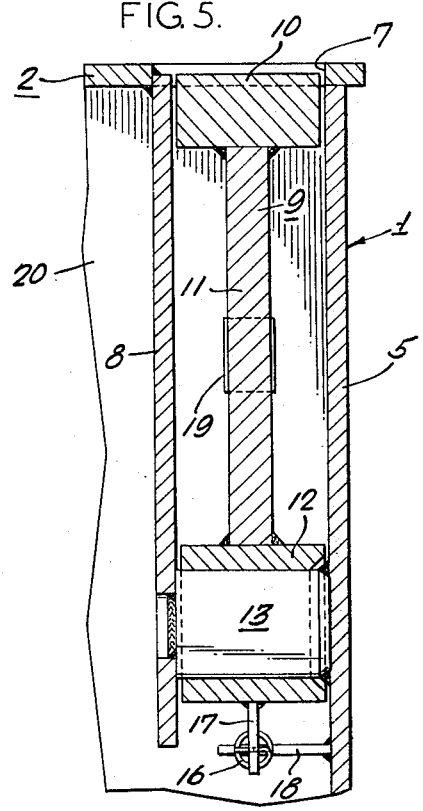
FIG. 5 is a sectional view, on an enlarged scale, taken along line 5—5 of FIG. 1.
Figure 3:
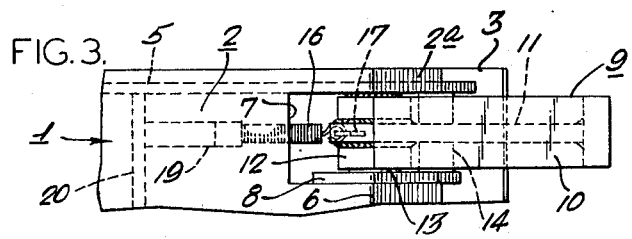
FIG. 3 is a fragmentary top or plan view of the support of the invention.

The support 1 of this invention, which is formed as by welding from a suitable rigid material such as steel plate, has a generally box-like configuration with a top wall 2, a bottom wall 3 substantially parallel thereto, and a pair of spaced, parallel upstanding side walls 4 and 5 interconnecting the top and bottom walls, near respective opposite edges of the top and bottom walls. The "box" structure thus formed has four walls, and is open at its front and rear ends. The top wall 2 is mostly planar, but a small portion of this wall near the rear edge thereof is bent downwardly from this plane (say at an angle of 20° to this plane), as at 2a. The inner or forward end of the bent portion 2a is indicated at 6 in FIG. 6, this end extending across the entire width of the top wall 2, less the portions of this wall cut out by a pair of slots to be described, and also by an opening to be described.

An open-ended slot 7 is cut in the top wall 2 from the rear edge of the wall, near one side edge thereof and immediately inwardly of the side wall 5. The slot 7 is U-shaped in plan but with square corners, and the base of the U is located some distance inwardly (i.e. forwardly) from the forward end 6 of the bent portion 2a.

Figure 4:
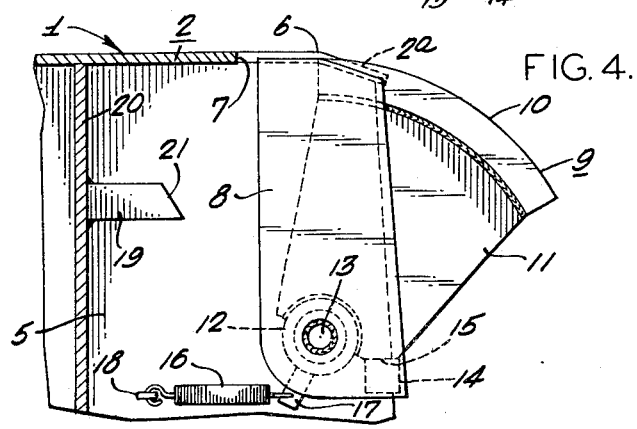
FIG. 4 is a sectional view taken along line 4—4 of FIG. 2.

A cheek plate 8, which is substantially rectangular in outer configuration but which is rounded off along an arc at its lower front corner, is welded along its upper edge to the cut edge of the top wall 2, at the inner longer edge of the slot 7. The upper end of cheek plate 8 is located just below the upper face of top wall 2 (see FIG. 4). (It may be noted here that the outer longer edge of slot 7 lies substantially in a common vertical plane with the inner face of side wall 5, and also that the cheek plate 8 is parallel to the side wall 5, plate 8 facing side wall 5 across the slot 7.) The rear portion of the upper edge of cheek plate 8 is cut along a taper, to match the taper of the bent portion 2a of top wall 2 (see FIG. 4).

A camming member, denoted generally by numeral 9, is mounted for pivotal (rotational) movement within slot 7. Camming member 9 comprises an upper flange-like element 10 whose upper face provides a camming surface, an intermediate web-like element 11 welded at its upper end to element 10, and a lower supporting sleeve 12 which is welded to the lower end of element 11.

Element 10 is formed from a piece of two-inch by four-inch flat bar stock which is bent into an arcuate configuration as seen in elevation (radius about 15 inches, to the center line of the two-inch dimension), the circumferential length of this element being about 60° The arcuate outer surface (radius about 16 inches) of element 10 provides a camming surface which normally (when member 9 is in its operative position in slot 7, with element 10 located adjacent the upper ends of cheek plate 8 and of side wall 5) extends rearwardly from the support of structure 1, and downwardly with respect to the top wall 2 thereof (see FIG. 1). The four-inch dimension of element 10 provides for side clearances between the sides of this element and the cheek plate 8 and the outer edge of slot 7, respectively, when the camming member 9 is positioned within slot 7.

Web element 11 is a plate having the approximate shape (when seen in elevation) of a sector of a circle, this element being welded at its upper end to the inner radius of element 10, centrally of the four-inch dimension thereof. At its lower end, element 11 has therein a semi-circular cut which conforms to about 180° of the circumference of sleeve 12, and at this cut the element 11 is welded to the outer cylindrical surface of sleeve 12.

Sleeve 12 surrounds and is rotatably mounted upon a fixed cylindrical supporting member 13 which is welded at its two ends respectively to the inner face of side wall 5 and to the outer face of cheek plate 8, so that the member 13 extends between cheek plate 8 and side wall 5, with its axis substantially horizontal. The center for the radii (of element 10) previously mentioned is on the axis of member 13.

It may be seen that the camming member 9 (comprising the rigidly-connected items 10, 11, and 12) is rotatable as a unit in a vertical plane, about the axis of member 13. The axis of member 13 is spaced vertically below the lower face of the planar portion of top wall 2, a distance such that, as camming member 9 rotates, the camming surface provided by element 10 (i.e., the outer cylindrical surface of said element) becomes tangent to a horizontal plane which is located just slightly below the upper face of the planar portion of top wall 2. In this connection, it may be noted that the axis of member 13 is preferably located in the same vertical plane as the forward end 6 of the top wall portion 2a. By way of example, with a 16-inch outer radius of element 10, the axis of member 13 might be located 15⅞ inches below the lower face of the planar portion of top wall 2. The purpose of this will become apparent hereinafter.

A stop member 14, comprising a short length of square bar stock, is welded at its two ends respectively to the inner face of side wall 5 and to the outer face of cheek plate 8, to serve as a stop member for limiting the rearward (i.e., clockwise in FIG. 1) rotation of the camming member 9. Element 11 has, at its lower rearward end, a beveled edge surface 15 which matches the upper horizontal surface of stop member or block 14 when camming member 9 reaches the rearward position illustrated in solid lines in FIG. 1.

In FIG. 1, the camming member 9 is illustrated in solid lines in its rearward position, wherein beveled surface 15 of element 11 is in contact with block 14. In this rearward or solid-line position, the camming surface provided by element 10 extends rearwardly from the support structure 1, and downwardly with respect to the top wall 2 thereof. Camming member 9 is free to rotate within limits, but is biased to the rearward position illustrated in solid lines in FIG. 1 (such that it is normally in this position, and is returned to this position when unloaded) by a biasing means which will now be described. One end of a tension spring 16 is connected to the free end of a spring clip member 17 (for example, a flat bar one inch wide and ¼-inch thick) which is welded at its other end to the outer cylindrical surface of sleeve 12, substantially diametrically opposite to element 11 (which as previously described is also welded to the outer cylindrical surface of this sleeve). The other end of spring 16 is connected to the free end of a spring clip member 18 (for example, a flat bar one inch wide, ¼-inch thick, and somewhat longer than member 17) which is welded at its other end to the inner surface of side wall 5, forwardly of supporting member 13; the axis of spring 16 extends substantially horizontally. There is some tension in spring 16 when camming member 9 is in the rearward position illustrated in solid lines in FIG. 1, sufficient to maintain member 9 in this position, in engagement with stop 14. When member 9 is rotated in the forward direction (i.e., counterclockwise in FIG. 1) clip member 17 rotates with sleeve 12, stretching spring 16 further and increasing the tension therein. Therefore, when the force which has rotated member 9 in the forward direction (against the bias of spring 16) is removed, which is to say when the camming surface of element 10 is unloaded, spring 16 returns member 9 to the solid-line position illustrated, wherein element 10 is in engagement with the stop block 14.

A stop member 19 (comprising a short length of flat bar stock, two inches high and one inch wide) is welded at one end thereof to the rear face of a transversely-extending mounting plate 20 which is secured at its sides to the inner faces of the respective side walls 4 and 5, at its upper end to the lower face of top wall 2, and at its lower end to the upper face of bottom wall 3. Plate 20 is located some distance forwardly of the forward closed end of slot 7. The stop member 19 is so located (on plate 20) as to be in alignment with the web element 11, to serve as a stop member for limiting the forward (i.e., counterclockwise in FIG. 1) rotation of the camming member 9. The free or rear end of stop member 19 is beveled as at 21, to match the angle of the forward face of web 11 when the camming member 9 reaches a forward limiting position during its rotation. This forward limiting position is illustrated in dotted lines in FIG. 1.

The camming construction previously described, including all of the items 7–19 and 21, is duplicated at the opposite side of the structure 1, near the side wall 4. That is to say, the construction previously described is symmetrical about the longitudinal center line of the "box" structure 1. Thus, two camming surfaces (the upper curved surfaces of two respective elements 10) are provided, one near each respective one of the two side walls 4 and 5.

The support 1 also includes other or additional structure, such as for coupling the support to a trailer, for coupling the support to a tractor, and for securing the support (with its attached trailer) in position on an auxiliary vehicle such as a ship. This other or additional structure will be described only briefly herein, since it is outside of the scope of the present invention.

Top wall 2 has therein a first inwardly-tapering opening 22, which extends inwardly from the center of the rear edge of this wall. The forward end of opening 22 merges into a second opening 23, which extends inwardly from the first opening 22. Opening 23 has an arcuate inner face, and is adapted to allow entry thereinto of the kingpin of a trailer.

A "fifth wheel" structure is provided on the support 1, for coupling the support to the kingpin of a trailer. This "fifth wheel" structure includes a releasable locking means for locking the trailer kingpin to the rigid box-like support 1, and may be quite similar to that disclosed in Patent No. 2,610,069. The "fifth wheel" structure, denoted generally by numeral 24, is fixed secured to the underside of top wall 2 of support 1, in alignment with the openings 22 and 23. Structure 24 is a fifth wheel of the type known in the art as a "Holland Hitch," and includes a pair of locking jaws 25 and 26 which are adapted to lock around the kingpin of a trailer. When the two locking jaws 25 and 26 of structure 24 are in the locked position illustrated in FIG. 6, a hollow cylindrical kingpin locking surface is provided which fully encircles the trailer kingpin. The longitudinal axis of the aforesaid kingpin locking surface lies in the vertical midplane of mounting plate 20, and such longitudinal axis is located approximately at the center of curvature of the arcuate inner surface of opening 23.

When jaws 25 and 26 are in their open positions, the kingpin of the trailer can enter opening 22, passing therealong into opening 23 and coming into contact with the rear end of jaw 26. (This movement of the trailer kingpin results from the movement of support 1 by a tractor, coupled thereto, rearwardly with respect to the stationary trailer.) This contacting of the rear end of jaw 26 by the trailer kingpin, coupled with the further pushing of this jaw forwardly, causes the jaws 25 and 26 to close on the kingpin, to fully encircle the same; the coupling and locking of the support 1 to a trailer (by means of the fifth wheel structure 24) is done automatically.

A releasing handle 27 is secured at its inner end to the structure 24, and this handle extends laterally outwardly through a suitable aperture provided in the upper end of side wall 4, to a point outside "box" 1. The handle 27 may be pulled outwardly with respect to "box" 1 to unlock the jaws 25 and 26, thereby to permit the trailer kingpin to be pulled out of the cylindrical kingpin locking surface provided by jaws 25 and 26 (this pulling out being effected by forward movement of the tractor, to which support 1 is coupled, and also of this support, with respect to the trailer). Thus, the releasing of the coupling of support 1 to a trailer is made manually (upon manual actuation of the releasing handle 27).

The upper end of a support transporting pin member (kingpin) 28 is welded to the lower face of top wall 2, opposite the opening 23 and spaced forwardly therefrom, so that pin 28 downwardly depends from the lower face of this top wall. It is here noted that the term "opposite," in this context, means that the longitudinal axis of pin 28 and the center of curvature of the arcuate portion of opening 23 lie in a common substantially vertical longitudinal plane. That is to say, pin 28 is forward of opening 23 and in alignment therewith. Pin 28 is similar to the kingpin commonly provided on trailers.

The kingpin 28 serves as a support transporting pin member, by means of which the support 1 (as well as a trailer which may be coupled to the support) may be secured to a movement means. This movement means, which may also be termed a loading and unloading device, may comprise a tractor such as that known in the art as an "Ottawa Yard Hustler"; such a tractor is quite similar to a common "over-the-road" tractor in general use for hauling trailers, except that the "Ottawa Yard Hustler" has a "fifth wheel" arranged to be hydraulically raised and lowered, whereas the "fifth wheel" of the conventional "over-the-road" tractor is incapable of vertical movement.

When the support 1 is to be coupled to the tractor "fifth wheel," the tractor is backed up to the front or forward end of the support, the tractor frame (which overhangs the rear axle of the tractor) then entering the space between the side walls 4 and 5, wtih the rear wheels of the tractor to the outside of side walls 4 and 5, such that these side walls are located, on each side, between the tractor rear wheels and the tractor frame. The tractor "fifth wheel" is then coupled to the support kingpin 28, for releasably securing the support 1 to the tractor.

A description of the operation of the invention, as disclosed up to this point, will now be given.

A conventional truck trailer is transported by a conventional or "over-the-road" tractor attached to the trailer kingpin, with the wheels of the trailer landing gear in "up" position. The trailer is then placed in the marshalling yard adjacent the auxiliary or carrying vehicle (ship) following which the landing gear is lowered and the conventional tractor uncoupled and removed, thereby completing the deposition of the trailer. The grease plate height of the trailer, as deposited, is generally not standard, and may be as low as 43 inches. In this connection, it will be remembered by those skilled in the art that the grease plate of a trailer is located on the underside of the trailer body, at the forward end thereof, immediately surrounding the trailer kingpin.

Support 1 is now utilized. The "Hustler" (tractor) is placed in a position wherein its "fifth wheel" is in lateral alignment with kingpin 28. The tractoris then backed into support 1, from the forward end thereof, until the pin 28 of this support enters the recess provided in the "fifth wheel" of the tractor. The kingpin locking means of the tractor is then actuated, to lock the support to the tractor.

Assuming that the fifth wheel structure 24 is in its released or open position (it will ordinarily be in this position when not coupled to a trailer), the tractor, now carrying support 1, is moved rearwardly toward the forward end of a deposited trailer.

The return spring 16 and stop means 14 on the support 1 have operated, as previously described, to bring the two camming members 9 to the "neutral" or normal position illustrated in FIG. 1, wherein the elements 10 overhang the support 1 at the rear end thereof, and wherein the camming surfaces provided by the cylindrical upper surfaces of elements 10 extend rearwardly and downwardly with respect to the top wall 2 of support 1. The cams (upper surfaces of elements 10) are positioned at such an angle and height that when the support 1 is backed into the forward end of a trailer, they come into contact, somewhere along their lengths, with the nose plate of the trailer. (In this connection, it will be remembered by those skilled in the art that the trailer nose plate is a rigid metal plate which is secured to the underside of the trailer body, at the forward end thereof, and extends across the entire width of the trailer body.) Further rearward motion of the support 1 with respect to the trailer causes the camming members 9 to rotate (this rotation would be in the forward or counterclockwise direction in FIG. 1), the trailer nose plate being now in engagement with the camming surfaces. As the camming members 9 thus rotate, the forward end of the trailer is raised or elevated up to the plane of the top wall 2. The trailer kingpin is thus raised to a position such that it can, and does, enter opening 22 and then move into opening 23. Further rearward movement of the support 1 by the tractor causes the trailer kingpin to engage the jaw 26, whereupon automatic coupling and locking of the support 1 to the trailer takes place.

It is desired to be pointed out that the camming members 9 of this invention make the support 1 compatible with the majority of deposited trailers, without the necessity of raising the latter to any fixed minimum grease plate height, such as 51 inches. That is to say, by the use of these camming members it is possible to place a trailer support 1, of a height (to its top wall 2) higher than the underside (nose plate) of a deposited highway trailer, under the trailer without separately raising the front end of the trailer, such raising being accomplished automatically by the rotating camming members 9 as the support 1 is backed into the trailer.

When the support 1 has been coupled to the trailer as previously described, the support-trailer combination is moved by the use of the "Hustler" to the position that it will assume on the carrying vehicle (ship).

As illustrated in FIG. 7, a locking spud member, denoted generally by numeral 29, is provided in the support 1, for the purpose of securing the support (with its attached trailer) in position on an auxiliary vehicle such as a ship. The spud member 29 is secured to the mounting plate 20, and can cooperate with a fixed abutment member (which is welded to the ship's deck) to secure the support 1 (and hence a trailer, fastened to the support) in position on the deck. It is noted that the locking spud member 29 is manually operated to secure the support 1 to the fixed abutment member.

The invention claimed is:

1. A support for trailers comprising a rigid box-like structure having a top wall, a bottom wall substantially parallel thereto, and a pair of spaced, parallel upstanding side walls interconnecting said top and bottom walls, said structure being constructed and arranged to rest on a trailer supporting surface and to underlie and support the forward end of a trailer with the trailer landing gear spaced above said surface; means mounted on said structure, adjacent the top wall thereof and toward the rear, for receiving the kingpin of a trailer and for releasably securing said kingpin to said structure, means carried by said structure for coupling the same to a transporting device, and a camming member rotatably mounted in said structure and having a camming surface which normally extends rearwardly from said structure and downwardly with respect to the top wall thereof, said camming member having a configuration approximating that of a sector of a circle centered on the axis of rotation of such member, the arcuate outer periphery of the sector-shaped member providing said camming surface; said camming member being operative when said structure is being moved by a transporting device rearwardly toward a trailer from a point forward thereof, for first engaging under the forward end of a deposited trailer resting on its landing gear and then, in response to further rearward movement of said structure, for raising the forward end of said trailer to bring the kingpin thereof into operative relation with said kingpin receiving and securing means.

2. Support as defined in claim 1, including also separate stop means for limiting the amount of rotation of said camming member in each respective one of the two opposite directions of rotation.

3. Support as defined in claim 2, including also means for normally biasing the camming member against that one of the stop means corresponding to a rearwardly-extending and downwardly-extending position of the camming surface.

4. Combination of claim 1, including two camming members of the type recited mounted adjacent the rear of said structure, one member being mounted adjacent each respective one of said side walls.

5. Support as defined in claim 4, including also separate stop means for limiting the amount of rotation of each respective one of said camming members in each respective one of the two opposite directions of rotation.

6. Support as defined in claim 5, including also means for normally biasing each respective one of the camming members against that respective one of the stop means corresponding to a rearwardly-extending and downwardly-extending position of each respective camming surface.

References Cited

UNITED STATES PATENTS

| | | | |
|---|---|---|---|
| 1,998,712 | 4/1935 | Fischer | 280—433 |
| 2,355,042 | 8/1944 | Billings | 280—433 |
| 2,730,376 | 1/1956 | Martin. | |
| 2,933,052 | 4/1960 | Mellam | 105—368 |
| 3,250,506 | 5/1966 | Thouvenelle et al. | |
| 3,392,944 | 7/1968 | Wyrough. | |

MARION PARSONS, JR., Primary Examiner